(12) United States Patent
Tizac et al.

(10) Patent No.: US 6,273,364 B1
(45) Date of Patent: Aug. 14, 2001

(54) STRUCTURE FOR ATTACHING A LANDING GEAR TO AN AIRCRAFT FUSELAGE

(75) Inventors: Laurent Tizac, Tournefeville; François-Pierre Ferran, Toulouse, both of (FR)

(73) Assignee: Aerospatiale Airbus, Paris (FR)

( * ) Notice: Subject to any disclaimer, the term of this patent is extended or adjusted under 35 U.S.C. 154(b) by 0 days.

(21) Appl. No.: 09/557,968

(22) Filed: Apr. 25, 2000

(30) Foreign Application Priority Data

May 5, 1999 (FR) .................................................. 99 05702

(51) Int. Cl.[7] .............................. B64C 25/00; B64C 25/10
(52) U.S. Cl. .................................. 244/100 R; 244/102 R
(58) Field of Search ........................... 244/100 R, 102 R, 244/102 A, 131

(56) References Cited

U.S. PATENT DOCUMENTS

| 2,309,550 | * | 1/1943 | Tampier | 244/102 R |
| 2,437,574 | * | 3/1948 | Watter et al. | 244/102 R |
| 2,752,112 | * | 6/1956 | Payne, Jr. | 244/102 R |
| 4,155,522 | * | 5/1979 | Sealey | 244/102 R |
| 5,000,400 | | 3/1991 | Stuhr | 244/102 R |
| 5,100,083 | * | 3/1992 | Large et al. | 244/102 R |
| 6,016,995 | * | 1/2000 | Squires et al. | 244/102 R |

* cited by examiner

*Primary Examiner*—Charles T. Jordan
*Assistant Examiner*—Christian M. Best
(74) *Attorney, Agent, or Firm*—Burns Doane Swecker & Mathis

(57) ABSTRACT

A structure for attaching the landing gear (16) to an aircraft fuselage incorporates a force take-up bar (32), housed coaxially in the barrel (24) of the landing gear. The force take-up bar (32) transmits lateral forces exerted by the landing gear (16) towards the outside of the aircraft when it is on the ground, to a ventral beam (22) connected to the fuselage. This characteristic permits the landing gear barrel (24) to be mounted in the non-reinforced lateral fitting (20), connected to the fuselage.

8 Claims, 3 Drawing Sheets

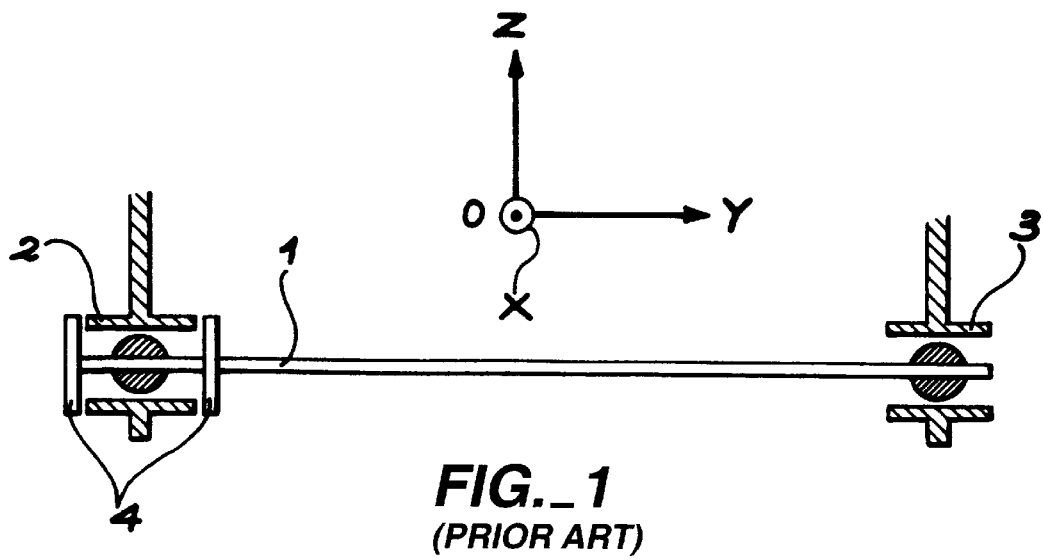
FIG._1
*(PRIOR ART)*
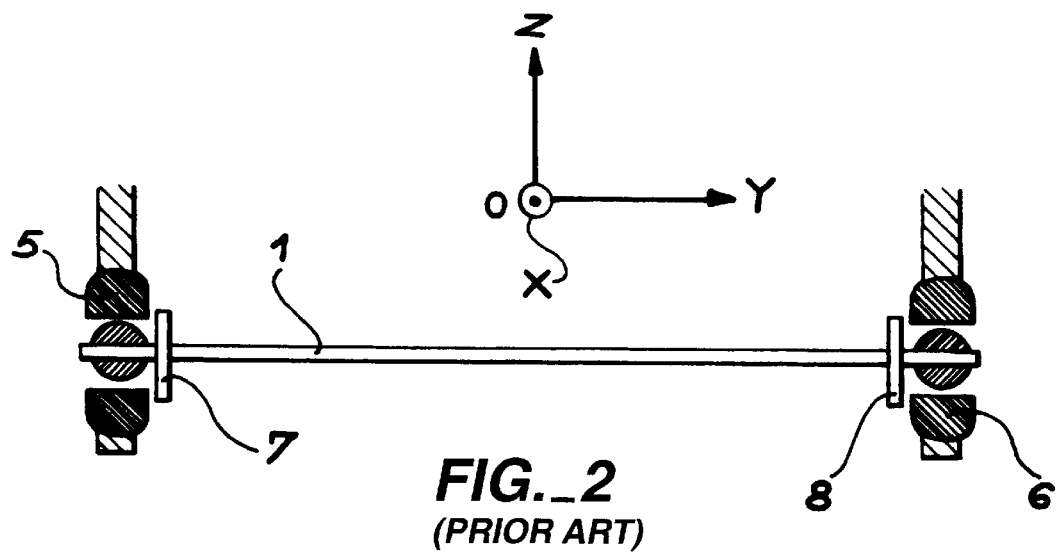
FIG._2
*(PRIOR ART)*

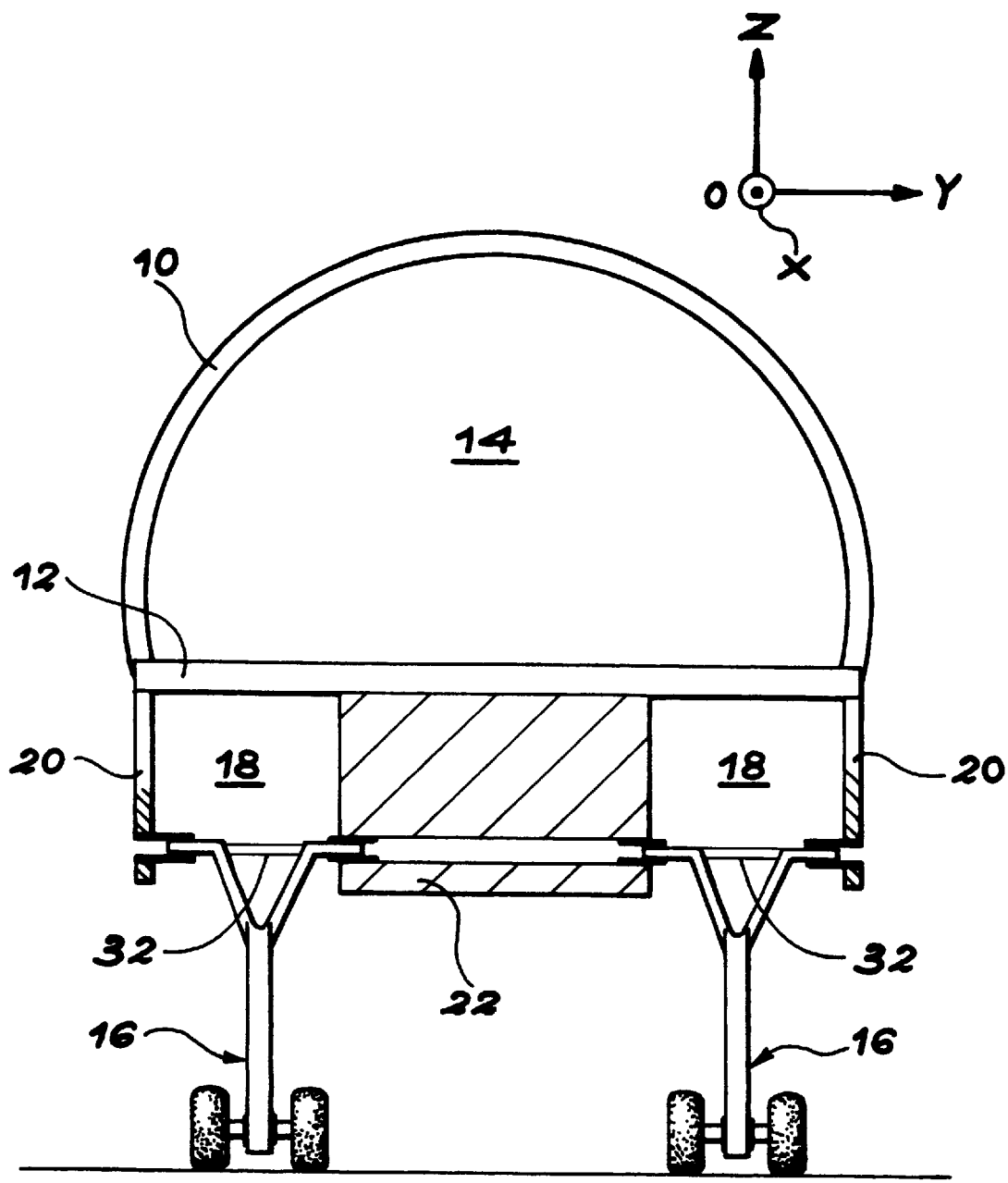
FIG._3

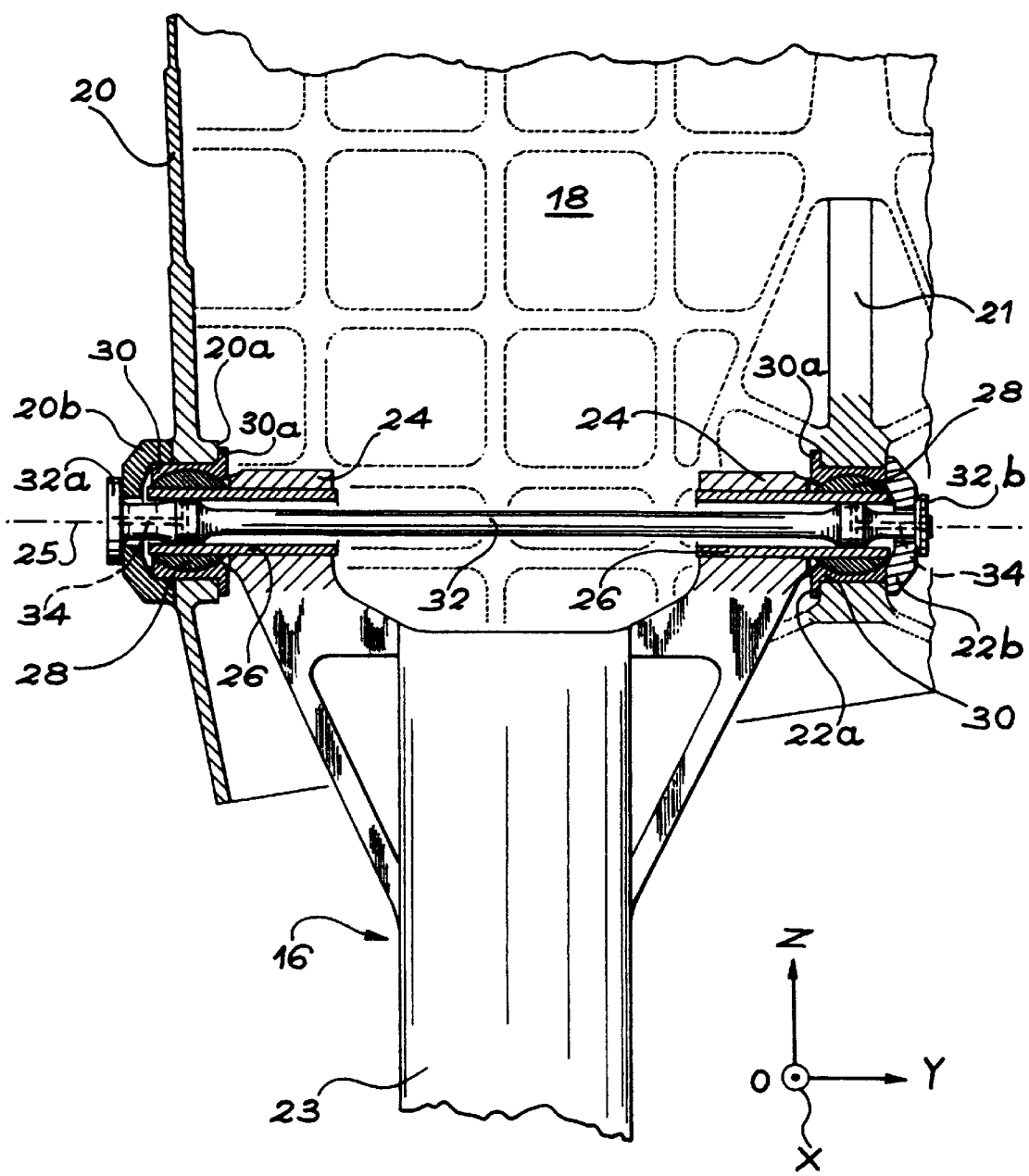
FIG._4

STRUCTURE FOR ATTACHING A LANDING GEAR TO AN AIRCRAFT FUSELAGE

DESCRIPTION

Technological Field

The invention relates to a structure for attaching landing gear positioned under the fuselage of an aircraft, through which forces borne by the landing gear, when it is lowered and in contact with the ground, are transferred to the fuselage.

The invention is applicable to any type of aircraft. However, it more particularly relates to wide-bodied aircraft, to which at least two sets of landing gear are fitted under the fuselage, on each side of at least one ventral beam that forms an integral part of the fuselage.

State of the Technology

The main function of landing gear fitted to aircraft is to distribute the aircraft load when it is on the ground, that is to say, during the phases of taxiing, taking off and landing. As such, the structure for attaching the landing gear to the fuselage must be capable of integrally supporting the load borne by the landing gear when the aircraft is not in flight. In effect, it is through the structure for attaching the landing gear to the aircraft structure that the forces borne by the landing gear are transmitted to the fuselage.

If an orthonormal datum point OXYZ is associated with the aircraft, at which the axes OX, OY and OZ coincide respectively with longitudinal, transverse and vertical axes of the aircraft, the main forces which re applied to the landing gear of the aircraft are orces directed along the axes OX, OY and OZ as well as torsional moment when the aircraft turns.

A first known structure for attaching landing gear to the structure of an aircraft is illustrated, in a very diagrammatic fashion, in FIG. 1 of the appended drawings. This type of assembly is used, notably on the Boeing 747 wide bodied aircraft, to connect each of the sets of landing gear positioned underneath it, to the fuselage.

In such a structure, the ends of a barrel 1 connected to the landing gear, are received in two fixed bearings 2 and 3, supported by the fuselage. In the case of landing gear positioned laterally under the fuselage, the outside bearing 2 is connected directly to the fuselage and the inside bearing 3 is mounted in a ventral beam which forms an integral part of the fuselage.

As has been diagrammatically illustrated in FIG. 1, means 4 are provided, in this case, to axially immobilize the barrel 1 in the outside bearing 2 mounted directly in the fuselage of the aircraft. When such an attachment structure is used, the longitudinal and vertical forces exerted along axes OX and OZ symmetrically pass through the two bearings 2 and 3, while the lateral forces exerted along the axis OY only pass through the outside bearing 2. The part of the fuselage in which the outside bearing 2 is mounted and the ventral beam in which the inside bearing 3 is mounted are then dimensioned in such a way as to be able to take up the forces that are liable to be transmitted to each of these bearings.

During the design of a new aircraft, the ventral beam in which the inside bearing 3 is mounted, can be dimensioned so that this beam is capable of efficiently taking up all the structural forces applied to the fuselage during the flight (flexion, torsion, etc.). The part of the fuselage in which the outside bearing 2 is mounted then no longer needs to be reinforced.

Under these conditions, the use of an attachment structure such as the one illustrated in FIG. 1 is excluded. In effect, the non-reinforced nature of the part of the fuselage in which the outside bearing 2 would be mounted, does not permit transfer to the aircraft structure, of the forces borne by the landing gear when the aircraft is on the ground in a sure fashion. Furthermore, it is not envisaged that the dimensioning of the part of the fuselage that supports the outside bearing 2 should be increased so that this part of the fuselage can ensure, without risk, the transmission of the forces borne by the landing gear to the structure of the aircraft. In effect, this would lead to dimensions that are too great, notably with regard to the thickness, as well as to an unacceptable increase in cost and in mass.

An inversion of the assembly illustrated in FIG. 1 could be envisaged, that is to say that the bearing 2 is mounted in the ventral beam of the aircraft and the bearing 3 in the fuselage structure. However, this would require a significant reinforcement of the part of the attachment situated at the side of the ventral beam. The consequent increase in the mass of the attachment which would arise from this will also run contrary to the desired goal.

It should be noted, in addition, that the type of attachment structure illustrated in FIG. 1, leads to the creation of a disymmetrical barrel. This requires one to use two different dies to manufacture the barrels for the sets of landing gear positioned under the fuselage. Taking account of the very expensive nature of this component, this constitutes a notable disadvantage from the economic point of view.

Finally, the assembly illustrated in FIG. 1 also has the disadvantage that the assembly is difficult to produce if the two bearings 2 and 3 are not perfectly aligned, because of the fixed nature of these bearings.

In FIG. 2 of the appended drawings, a second known type of structure for attaching landing gear has been shown in very diagrammatic fashion. In this case, the barrel 1 is supported at each of its ends by two ball joints 5 and 6. On a wide bodied aircraft, these ball joints 5 and 6 are respectively mounted in the structure of the fuselage and in a ventral beam forming an integral part of the fuselage. The connection between the barrel 1 and each of the ball joints 5 and 6 is made in a totally symmetrical fashion, using two clamping components 7 and 8. These clamping components 7 and 8 are suitable for transmitting the lateral forces along the axis OY respectively to ball joint 5 and to ball joint 6, depending on whether the forces are exerted towards the outside (to the left in FIG. 2) or towards the inside of the aircraft.

In comparison with the type of attachment structure previously described and with reference to FIG. 1, this assembly has the advantages of being symmetrical and easy to assemble.

Nevertheless, it leads, like the previous structure, to the transmission of forces along the axis OY directly to the fuselage, through the clamping component 7 and the external ball joint 5, when these forces are directed toward the outside of the aircraft. As has already been observed, this layout is not satisfactory in the case of an aircraft of new design, the ventral beam of which has been dimensioned in such a way that it takes up all the structural forces which are applied to the fuselage during the flight and in which, as a consequence, the fuselage is not reinforced at this point.

DESCRIPTION OF THE INVENTION

The precise subject of the invention is a structure for attaching landing gear positioned under the fuselage of an aircraft, that permits the transmission to a ventral beam connected to the fuselage, the set of lateral forces borne by the landing gear so that it is not necessary to reinforce the structure of the fuselage in the area of attachment of the landing gear, and without, for all that, increasing either the mass of the aircraft or its cost.

Conforming to the invention, this result is obtained by means of a structure for the attachment of landing gear to an aircraft fuselage, said structure comprising a barrel connected to the landing gear, the ends of which, turned towards the inside and towards the outside of the aircraft, are supported respectively by a ventral beam and by a lateral fitting connected to the fuselage, a structure characterized in that it further comprises a force take-up bar, which connects the lateral fitting to the ventral beam coaxially with the barrel, in such a way as to transmit, to the ventral beam, forces exerted by the barrel on the lateral fitting along the axis of the barrel and towards the outside of the aircraft.

Advantageously, each of the ends of the barrel is supported respectively by the ventral beam and by the lateral fitting through a ball joint.

In a preferred embodiment of the invention, the barrel is hollow and the force take-up bar is housed inside it.

Advantageously, the force take-up bar is pressed against the lateral fitting and against the ventral beam in such a way as to be under tension.

In this case, a first end of the bar is preferably pressed against a surface of the lateral fitting turned toward the outside of the aircraft, and a second end of the bar is pressed against a surface of the ventral beam turned toward the inside of the aircraft.

Said surfaces, against which the first and second ends of the bar are pressed, are advantageously formed on caps which the bar passes through and which cover the ball joints mounted respectively in the lateral fitting and in the ventral beam.

Advantageously, one of the two ends of the bar can be disassembled.

Finally, lubricating holes for the ball joints are advantageously made in the end parts of the bar.

BRIEF DESCRIPTION OF THE DRAWINGS

By way of a non-limitative example, a preferred embodiment of the invention will now be described, making reference to the appended drawings, in which:

FIG. 1, already described, represents very diagrammatically a first type of attachment structure according to the prior art;

FIG. 2, already described, represents very diagrammatically a second type of attachment structure according to the prior art;

FIG. 3 is a cross section view of an aircraft fitted with two sets of landing gear under the fuselage connected to the structure of the aircraft by attachment structures conforming to the invention; and FIG. 4 is a section view representing on a larger scale, the structure for the attachment of one of the sets of landing gear illustrated in FIG. 3.

DETAILED DESCRIPTION OF A PREFERRED EMBODIMENT OF THE INVENTION

In FIG. 3, the central part of the aircraft sectioned at right angles to the main landing gear has been shown in a very diagrammatic fashion. The aircraft comprises a fuselage 10 and a floor 12, internally defining a pressurized cabin 14.

In the part illustrated in FIG. 3, the fuselage 10 is truncated at the bottom, below the floor 12, in such a way that it is possible to house two sets of landing gear 16 in two landing gear compartments 18. Each landing gear compartment 18 is bounded on the outside of the aircraft by a lateral fitting 20 fixed to the fuselage 10 and on the inside of the aircraft, by one or two ventral beams 22.

In this arrangement, the ventral beam or beams 22 are dimensioned in a way that enables it or them to take up integrally all the structural forces which are applied to the fuselage 10 during the flight (flexion, torsion, etc.). This dimensioning also permits the ventral beam or beams 22 to take up half of the forces applied along the axes OX and OZ, through the sets of landing gear 16, when the aircraft is on the ground. Conforming to the invention, the ventral beam or beams 22 also take up the set of lateral forces applied through the sets of landing gear along the axis OY, when the aircraft is on the ground.

Thanks to this arrangement, the lateral fittings 20 do not need to be reinforced. Conforming to the invention, they are only used to transmit to the fuselage half of the forces applied along the OX and OZ axes by the corresponding set of landing gear 16.

One of the attachment structures through which the sets of landing gear 16 are mounted under the fuselage 10 of the aircraft will now be described in greater detail making reference to FIG. 4.

Since the two structures are identical, the description may be applied to either one of these structures, one being the mirror image of the other.

In the case of an aircraft comprising several pairs of sets of landing gear installed under the fuselage, an attachment structure comparable to that which will now be described can be used for each of the sets.

As shown in FIG. 4, the attachment structure comprises a barrel 24 forming the upper part of the landing gear leg 23 when the landing gear 16 has been lowered. In the embodiment shown, where the upper part of the landing gear leg 23 approximately forms a Y, the barrel 24 comprises two cylindrical parts aligned along the same axis 25, parallel to the axis OY transverse to the point OXYZ associated with the aircraft.

Each of the two parts of the barrel 24 is mounted on a hollow pivot 26. This pivot 26 extends toward the outside, with respect to the landing gear leg, in such a way that it goes into a hollow sphere 28 of a ball joint. More precisely, the hollow ball joint sphere 28 is fixed on the corresponding pivot 26 and the adjacent part of the barrel 24 freely turns on the pivot 26.

Each of the hollow ball joint spheres 28 rotatably mounted in a ball joint body 30 fitted with a flange 30a on one of its ends. Each of the assemblies constituted by a hollow sphere 28 and a ball joint body 30 forms a ball joint.

One of the ball joint bodies 30, turned towards the outside of the aircraft (to the left in FIG. 4), is fixed in a bore passing through the lateral fitting 20 connected to the fuselage. More precisely, the flange 30a on this ball joint body 30 is pressed against a face 20a of the lateral fitting 20 turned towards the inside of landing gear compartment 18.

In a comparable way, the other ball joint body 30 (to the right in FIG. 4) is received in a bore made in the ventral beam 22 and the flange 30a formed on this ball joint body 30 is pressed against the face 22a of the ventral beam 22, turned towards the inside of the landing gear compartment 18.

The arrangement that has just been described enables on the one hand the lateral fitting 20 and on the other hand the ventral beam 22 to take up half of the longitudinal and vertical forces exerted along the axes OX and OZ by the landing gear 16, when the aircraft is on the ground.

Conforming to the invention, this arrangement is complemented by a particular structure, that permits one to transmit the set of lateral forces exerted by the landing gear 16 along the axis OY integrally to the ventral beam 22, without the need for any over-dimensioning and without creating disymmetry in the barrel 24. Hence, the barrel 24 can be produced in a symmetrical fashion with respect to a median plane parallel to axes OX and OY, as illustrated in FIG. 4. This reduces the cost of manufacture by permitting the manufacture of all the barrels 24 for landing gear positioned under the fuselage using a single die.

This particular arrangement is characterized by the presence in the attachment structure of a force take-up bar 32, which connects the lateral fitting 20 to the ventral beam 22, and which is coaxial with the barrel 24, in such a way that lateral forces that are possibly exerted by the barrel 24 on the lateral fitting 20 towards the outside of the aircraft, are transmitted integrally to the ventral beam 22 along axis OY.

More precisely, the force take-up bar 32 is a drawbar, of circular section, which is slidably housed in the hollow pivots 26 and thus passes coaxially through the barrel 24 and the ball joints formed by the hollow spheres 28 and the ball joint bodies 30.

At one of its ends, able to be turned towards the outside of the aircraft (on the left in FIG. 4), the force take-up bar 32 comprises a head 32a, normally held pressed against the external surface of a cap 20b, itself pressed against the external surface of the lateral fitting 20. The force take-up bar 32 passes through this cap 20b which covers the ball joint formed by the hollow sphere 28 and the ball joint body 30 mounted in the lateral fitting 20.

At its opposite end, turned towards the inside of the aircraft, (to the right in FIG. 4), the force take-up bar 32 comprises a thread onto which a nut 32b is normally screwed. This nut 32b is pressing against a surface, turned towards the inside of the aircraft, formed on a cap 22b. This cap 22b is itself pressing against a surface of an intermediate fitting 21 integral with the ventral beam 22 turned towards the inside of the aircraft. It covers the ball joint formed by the hollow sphere 28 and the body 30 of the ball joint mounted in the intermediate fitting 21.

Hence, when the nut 32b is tightened, the force take-up bar 32 is pressed simultaneously against the side fitting 20 and the intermediate fitting 21, in such a way as to be under tension between these two components, along the transverse axis OY.

The barrel 24 forms two pivots mounted with slight axial clearance between the faces that are opposite each other, turned towards the inside of the landing gear compartment 18, with the flanges 30a on the ball joint bodies 30 mounted respectively in the lateral fitting 20 and in the intermediate fitting 21.

Consequently, when the landing gear 16 is subjected to a lateral force towards the inside of the aircraft along the axis OY, the part of the barrel 24 nearest the ventral beam 22 is pressed against the flange 30a of the body of the ball joint 30 mounted in the ventral beam. This lateral force is therefore directly transmitted to the intermediate fitting 21 connected to the ventral beam 22 through the flange 30a of the corresponding ball joint body.

In a contrary way, when the landing gear 16 is subjected to a lateral force towards the outside of the aircraft along the axis OY, the part of the barrel 24 nearest the lateral fitting 20 is pressed against the flange of the ball joint body 30 mounted in this fitting. This lateral force is then applied to the fitting 20, which transmits it integrally to the force take-up bar 32 through the cap 20b and the head 32a of the bar. In its turn, the force take-up bar 32 transmits the lateral force exerted towards the outside of the aircraft along axis OY to the intermediate fitting 21, connected to the ventral beam 22, through the nut 32b and the cap 22b.

As a consequence, the lateral fitting 20 does not bear any lateral force whatsoever along axis OY. It therefore has no need to be reinforced so the mass of the attachment structure is not increased.

As is also illustrated in FIG. 4, lubrication holes 34 are advantageously machined in the bar 32, in each of its end parts, to enable grease to be introduced to lubricate the pivots, at places where this is necessary.

As has already been observed, the arrangement described preserves the symmetry of the barrel 24 with respect to a plane perpendicular to the OY axis. Considerable economies are thereby made, taking account of the cost of the die necessary to produce such a component. In effect, this symmetrical characteristic of the barrel 24 enables the same die to be used to produce the barrels for both the left and the right hand sets of landing gear placed under the fuselage.

In addition, the assembly of the structure is made easier by the presence of the ball joints respectively positioned between the outside end of the barrel 24 and the lateral fitting 20 and between the inside end of the barrel 24 and the intermediate fitting 21. In effect, any possible faults in the alignment of the holes formed in the lateral fitting and in the intermediate fitting can be easily compensated for by these ball joints.

It is clearly understood that the invention is not restricted to the embodiment which has just been described by way of an example, but covers all the variants of it. Hence it will be understood in particular that such an attachment structure can be used both on an aircraft fitted with one single ventral beam and on an aircraft fitted with two ventral beams separated from one another.

What is claimed is:

1. Structure for attaching landing gear to an aircraft fuselage, said structure comprising a barrel connected to the landing gear, the ends of which, turned towards the inside and towards the outside of the aircraft, are supported respectively by a ventral beam and by a lateral fitting connected to the fuselage, said structure additionally comprising a force take-up bar, which connects the lateral fitting to the ventral beam coaxially with the barrel, in such a way that forces exerted by the barrel on the lateral fitting along the axis of the barrel and towards the outside of the aircraft, are transmitted to the ventral beam.

2. Structure according to claim 1, in which each of the ends of the barrel is supported respectively by the ventral beam and by the lateral fitting, using a ball joint.

3. Structure according to claim 2, in which the barrel is hollow and the force take-up bar is housed inside said barrel.

4. Structure according to claim 3, in which the force take-up bar is pressed against the lateral fitting and against the ventral beam in such a way as to be under tension.

5. Structure according to claim 4, in which a first end of the bar is pressed against a surface, turned towards the outside of the aircraft, of the lateral fitting and a second end of the bar is pressed against a surface turned towards the inside of the aircraft, of the ventral beam.

6. Structure according to claim 5, in which said surfaces, against which the first and second ends of the bar are pressed are formed on caps through which said bar passes and which cover the ball joints mounted respectively in the lateral fitting and in the ventral beam.

7. Structure according to claim 5, in which one of the first and second ends of the bar can be disassembled.

8. Structure according to claim 1, in which lubrication holes for the ball joints are made in the end parts of the bar.

* * * * *